(12) United States Patent
Stegens et al.

(10) Patent No.: US 6,779,231 B1
(45) Date of Patent: Aug. 24, 2004

(54) V-BELT DRIVEN VACUUM CLEANER BRUSHROLL

(75) Inventors: Alfred H. Stegens, Olmsted Township, OH (US); Eric A. Stegens, Olmsted Falls, OH (US)

(73) Assignee: The Scott Fetzer Company, Westlake, OH (US)

( * ) Notice: Subject to any disclaimer, the term of this patent is extended or adjusted under 35 U.S.C. 154(b) by 0 days.

(21) Appl. No.: 10/671,761

(22) Filed: Sep. 25, 2003

(51) Int. Cl.[7] .................................................. A47L 9/04
(52) U.S. Cl. ........................ 15/389; 15/41.1; 15/392
(58) Field of Search ........................... 15/41.1, 43, 389, 15/391, 392

(56) References Cited

U.S. PATENT DOCUMENTS

| 4,361,929 A | | 12/1982 | Jinkins ......................... 15/355 |
| 4,375,117 A | * | 3/1983 | Lyman ......................... 15/389 |
| 4,648,150 A | * | 3/1987 | Morishita et al. ............. 15/389 |
| 4,912,805 A | | 4/1990 | Krasznai et al. .............. 15/392 |
| 6,574,823 B1 | | 6/2003 | Stegens ........................ 15/182 |
| 6,591,441 B2 | | 7/2003 | Stegens et al. ............... 15/179 |

* cited by examiner

*Primary Examiner*—Theresa T. Snider
(74) *Attorney, Agent, or Firm*—Pearne & Gordon LLP

(57) ABSTRACT

A vacuum cleaner brushroll including a spindle rotated by a drive belt having grooves in its inner drive surface extending lengthwise around the belt, and a pulley formed in one-piece with the spindle, the pulley having a flat, smooth belt surface parallel to the spindle axis.

3 Claims, 1 Drawing Sheet

V-BELT DRIVEN VACUUM CLEANER BRUSHROLL

TECHNICAL FIELD

The present invention relates generally to vacuum cleaners, and more specifically to a V-belt driven vacuum cleaner brushroll.

BACKGROUND OF THE INVENTION

One typical vacuum cleaner brushroll has a wood spindle or dowel that is provided with a pulley for coacting with a V-belt having grooves or slots extending lengthwise on the belt in its inner surface. Conventionally, both the power shaft pulley and the brushroll pulley have teeth that coact with the grooves of the V-belt.

In the conventional construction described above, the brushroll pulley is an injection molded member which is pressed fitted over the end of the dowel. In order to form a positive lock between the pulley and the spindle, holes have been drilled in the pulley collar and some of the brushroll bristles have been inserted through the holes into the dowel. Heretofore, the provision of a toothed pulley on the dowel has been considered necessary when using a V-belt as previously described.

SUMMARY OF THE INVENTION

The present invention is based on the discovery that it is not necessary to provide a toothed brushroll pulley in a V-belt type drive system in which the V-belt has grooves in its inner surface extending lengthwise of the belt.

In accordance with this invention, a vacuum brushroll has a pulley characterized by smooth, flat V-belt engaging surface that is parallel to the brushroll axis. The smooth V-belt engaging surface surprisingly obtains substantially the same torque as a pulley formed with ribs that interact with the grooves of the V-belt. Since it is not necessary to have a ribbed pulley in order to achieve the desired torque, the pulley and spindle can be formed as one piece. In the case of a wood dowel, the smooth pulley is simply machined in the outer surface of the dowel. By eliminating the need for a separately formed ribbed pulley, the invention materially decreases the cost of manufacturing brushrolls driven by a grooved V-belt.

Many other advantages and a fuller understanding of the invention will be had from the following detailed description and the accompanying drawings.

DESCRIPTION OF THE PREFERRED EMBODIMENT

Figure 1:
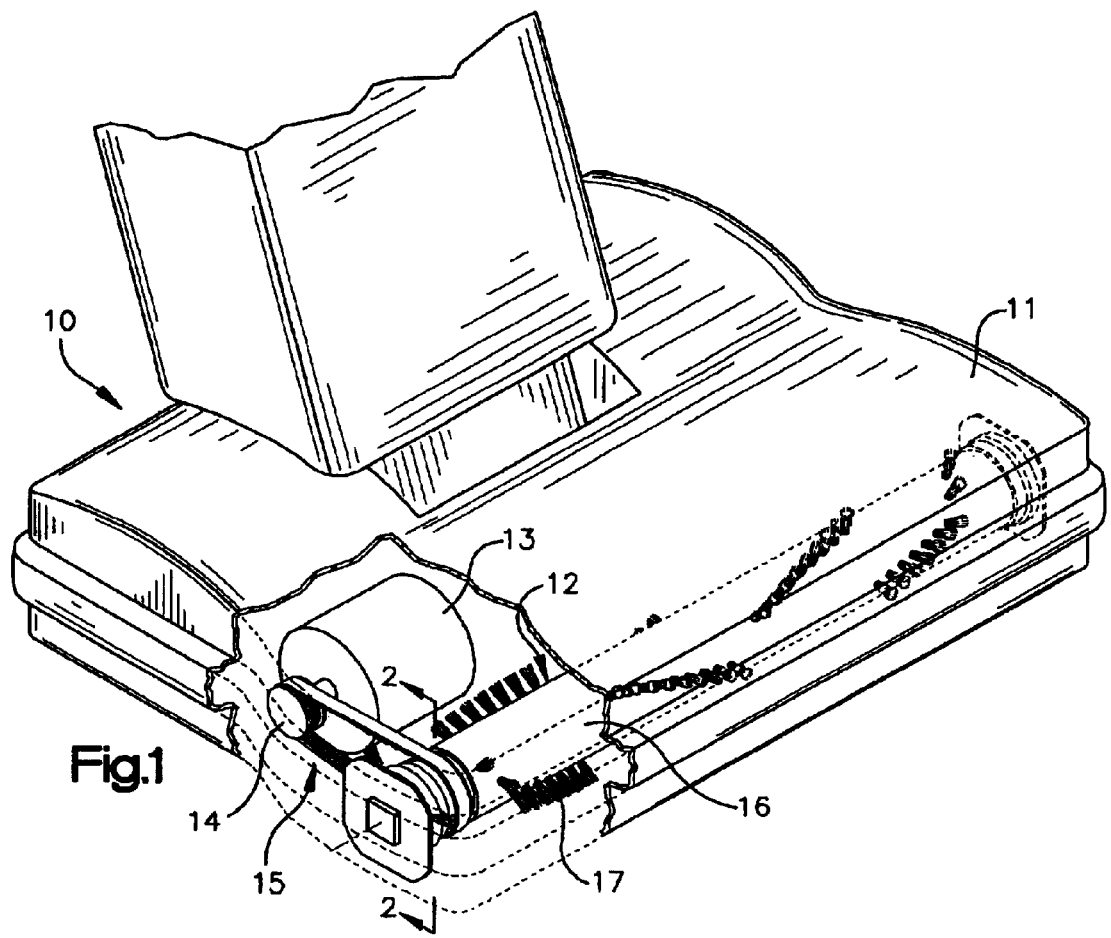
FIG. 1 is a partial cut away perspective view of a vacuum cleaner embodying the belt drive and pulley of this invention.
Figure 2:
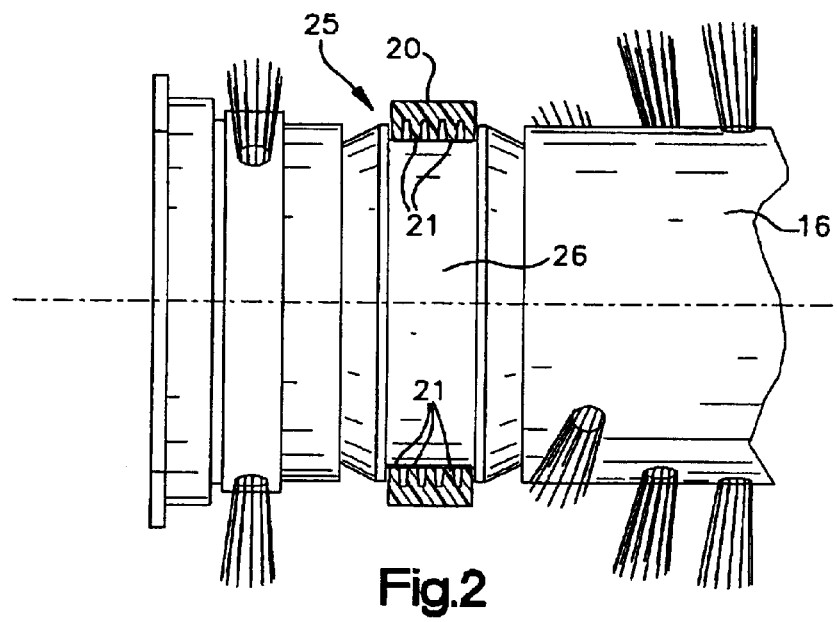
FIG. 2 is an enlarged fragmentary elevational view taken in the plane of the lines 2—2 of FIG. 1.

Referring now to the drawings, and to FIG. 1 in particular, an illustrative vacuum cleaner is generally indicated by reference numeral 10. The vacuum cleaner 10 has a housing 11 in which a brushroll 12 is mounted for rotation. A motor 13 has a drive pulley 14 that is coupled to the brushroll 12 by the belt and pulley drive system 15 of the invention. The brushroll 12 has a spindle or dowel 16 usually made of wood and bristle tufts 17 which agitate the carpet to loosen dirt as the brushroll 12 is rotated.

Many different belt drive vacuum cleaners and brushrolls as generally described above are known and available. The illustrated vacuum cleaner and brushroll have been chosen simply to illustrate how the new pulley belt drive of the invention can be arranged and used to advantage, and are not to be considered to be limiting or part of the present invention.

The pulley and drive belt system of the invention includes a V-belt 20 having grooves 21 in its inner surface that extend lengthwise of the belt. As shown in FIG. 1, the drive pulley 14 is conventionally made with ribs that coact with the grooves 21 of the V-belt.

The dowel 16 has a pulley 25 that is formed as part of the dowel 16. The pulley 25 can be easily formed in the wood dowel 16 by a simple machining operation. In accordance with the present invention, the pulley 25 is characterized by a smooth belt engaging surface 26 that is parallel to the axis of the brushroll.

The torque generated by the smooth drive surface 26 and the grooved pulley belt 20 is essentially the same as with the conventional construction in which a pulley on the brushroll has ribs that coact with the V-belt in the manner of the ribbed motor pulley 14. It will be seen that the recognition of this drive capability makes it possible to eliminate the pulley ribs and thereby eliminate the need for a pulley made in a separate manufacturing operation and assembled onto the dowel.

Many modifications and variations of the invention will be apparent to those skilled in the art in light of the foregoing detailed disclosure. Therefore, it is to be understood that, within the scope of the appended claims, the invention can be practiced otherwise than as specifically shown and described.

What is claimed is:

1. In a vacuum sweeper including a brushroll spindle rotated by a V-belt having grooves in its inner surface that extend lengthwise around the belt, and a pulley on the brushroll spindle that is engaged by the belt, the improvement wherein said pulley has a smooth belt-engaging surface coacting with said belt.

2. In a vacuum sweeper including a brushroll spindle rotated by a V-belt having grooves in its inner surface that extend lengthwise around the belt, and a pulley on the brushroll spindle that is engaged by the belt, the improvement wherein said pulley has a smooth belt-engaging surface coacting with said belt, and wherein said spindle and said pulley are a one-piece member.

3. A vacuum sweeper brushroll comprising a spindle and a pulley on said spindle, said spindle and said pulley being a one-piece member, said pulley having a flat, belt-engaging surface that is parallel to the lengthwise axis of said spindle, and a V-belt having grooves in its inner surface that extend lengthwise around the belt, said surface being engageable by said grooves to cause rotation of said brushroll.

* * * * *